(12) United States Patent
Ishiguro et al.

(10) Patent No.: US 6,817,770 B2
(45) Date of Patent: *Nov. 16, 2004

(54) SINGLE ROW DEEP GROOVE RADIAL BALL BEARING

(75) Inventors: Hiroshi Ishiguro, Kanagawa (JP); Fusasuke Gotoh, Kanagawa (JP); Toshihisa Ohata, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/424,160

(22) Filed: Apr. 28, 2003

(65) Prior Publication Data

US 2004/0076355 A1 Apr. 22, 2004

Related U.S. Application Data

(63) Continuation of application No. 09/772,957, filed on Jan. 31, 2001, now Pat. No. 6,554,480.

(30) Foreign Application Priority Data

Jan. 31, 2000 (JP) ..................................... P. 2000-022089

(51) Int. Cl.[7] ............................................... F16C 33/58
(52) U.S. Cl. ....................................... 384/516; 384/450

(58) Field of Search ................................ 384/450, 513, 384/516

(56) References Cited

U.S. PATENT DOCUMENTS

| | | | | | |
|---|---|---|---|---|---|
| 1,587,184 | A | * | 6/1926 | Riebe | 384/516 |
| 2,142,474 | A | * | 1/1939 | Langhaar | 384/516 |
| 2,142,478 | A | * | 1/1939 | Murden | 384/516 |
| 3,370,899 | A | * | 2/1968 | Eklund | 384/516 |
| 4,334,721 | A | * | 6/1982 | Satoh et al. | 384/450 |
| 4,343,521 | A | * | 8/1982 | Akabane et al. | 384/450 |
| 4,565,457 | A | * | 1/1986 | Flander | 384/450 |
| 6,273,230 | B1 | * | 8/2001 | Nakano et al. | 384/516 |
| 6,554,480 | B2 | * | 4/2003 | Ishiguro et al. | 384/516 |

* cited by examiner

Primary Examiner—Thomas R. Hannon
(74) Attorney, Agent, or Firm—Sughrue, Mion, PLLC

(57) ABSTRACT

The radius of curvature r1, r2 of the cross-sectional shape of an inner ring raceway 11d is made smaller at a central portion 19 and larger at end portions 20. A contact ellipse at the end portions is made small by increasing the radius of curvature r2 of the end portions 20 to thereby secure an allowable moment load. In contrast with this, an angular gap is reduced by reducing the radius of curvature r1 of the central portion 19.

18 Claims, 8 Drawing Sheets

SINGLE ROW DEEP GROOVE RADIAL BALL BEARING

This is a continuation of Application Ser. No. 09/772,957 filed Jan. 31, 2001, now U.S. Pat. No. 6,554,480; the disclosure of which is incorporated herein by reference.

BACKGROUND OF THE INVENTION

A single row deep groove radial ball bearing according to the present invention is used to support a rotary member such as a pulley and to removably support an offset load.

Automotive accessories such an alternator and a compressor are driven to rotate by an engine for driving a vehicle. Due to this, an endless belt is extended between follower pulleys fixed to end portions of rotating shafts of the automotive accessories and a drive pulley fixed to an end portion of a crankshaft of the driving engine, and the rotating shafts are constructed to be driven to rotate based on the circulation of the endless belt.

FIG. 5 illustrates the construction of a rotational driving portion of a rotating shaft 1 of a compressor constituting an automotive air conditioner. The rotating shaft is rotatably supported by rolling bearings, not shown, within a casing 2. A follower pulley 4 is rotatably supported around the circumference of a supporting tube portion 3 provided on an outer circumference of an end portion of the casing 2 by a single row deep groove radial ball bearing 5. The follower pulley 11 is formed into an annular configuration, on the whole, which has substantially a U-shaped cross section, and a solenoid 6 which is fixed to an end face of the casing 2 is disposed within an internal space of the follower pulley 4. On the other hand, a mounting bracket 7 is fixed to a portion protruding from the casing 2 at an end portion of the rotating shaft 1, and an annular plate 21 of a magnetic material is supported on the circumference of the mounting bracket 7 via a plate spring 8. The annular plate 21 is spaced away from the follower pulley 4, as shown in FIG. 5, when the solenoid 6 is not energized, while when the solenoid 6 is energized, the annular plate 21 is drawn toward the follower pulley 4 so as to be secured thereto, so that a rotational force is free to be transmitted from the follower pulley 4 to the rotating shaft 1.

With the rotational supporting device as described above, there may be a case where a transverse central position (a chain line α in FIG. 5) of the endless belt wound around an outer circumference of the follower pulley 4 is not allowed to coincide with a transverse central position (a chain line β in FIG. 5) of the single row deep groove radial ball bearing 5. In such a case, a moment load in proportion to a deviating amount (offset amount) δ between the transverse central positions of the two members is applied to the single row deep groove radial ball bearing 5 based on the tension of the endless belt. Then, a central axis of an inner ring 9 and a central axis of an outer ring 10 which constitute the single row deep groove radial ball bearing 5 do not coincide with each other (they are inclined).

With a mechanism like one as described above, when the central axes of the inner ring 9 and the outer ring 10 do not coincide with each other, there occurs an unbalanced wear of the endless belt which is wound around the outer circumference of the follower pulley 4, this making it difficult to secure the durability of the endless belt. In addition, the inclination of the central axes also makes it impossible to secure a certain gap between the annular plate 21 and the follower pulley 4, resulting in a possibility that these two members 21, 4 come into friction with each other. In the event that such a friction occurs, abnormal wear and abnormal noise are likely to be generated unfavorably. With a view to preventing the occurrence of these inconveniences, it is considered to reduce an angular gap of the single row deep groove radial ball bearing 5 in order to make it difficult that the central axes of the inner ring 9 and the outer ring 10 discord with each other.

Then, in order to reduce the angular gap for the aforesaid purpose, the following (1) to (4) procedures will be contrived.

(1) Radius of curvatures of cross-sectional shapes of an inner ring raceway 11 formed in an outer circumferential surface of the inner ring 9 and an outer ring raceway 12 formed in an inner circumferential surface of the outer ring 10 are made small (they are to be reduced so as to approximate 50% of the outside diameter of balls 13 constituting the single row deep groove radial ball bearing 5).

(2) As shown in FIG. 6, the raceway surface of one or both of an inner ring raceway 11a in an outer circumferential surface of an inner ring 9a and an outer ring raceway 12a in an inner circumferential surface of an outer ring 10a is formed into a combined surface, and rolling surfaces of balls 11 are brought into contact with both the raceway surfaces at three or four points.

(3) As shown in FIG. 7, the heights of shoulder portions 14a, 14b existing on transverse (in left and right directions in FIG. 7) sides of the raceway surface of one or both of an inner ring raceway 11b in an outer circumferential surface of an inner ring 9b and an outer ring raceway 12b in an inner circumferential surface of an outer ring 10b are made higher as indicated by a solid line than a general height indicated by a chain line in the same figure.

(4) As shown in FIG. 8, a plural row radial ball bearing 15 is used in which a plurality of balls 13, 13 are provided between a plurality of inner ring raceways 11c, 11c formed in an outer circumferential surface of an inner ring 9c and between a plurality of outer ring raceways 12c, 12c formed in an inner circumferential surface of an outer ring 10c, respectively.

The conventionally known and contrived constructions for reducing the angular gap as described above have the following problems.

First of all, in the case of the construction described under (1), although the angular gap can be reduced, the contact ellipses existing at abutting portions of the rolling surfaces of the respective balls and the inner ring raceway 11 and the outer ring raceway 12 become larger. Then, the contact ellipses dislodge from the inner ring raceway 11 and the outer ring raceway 12 when the central axes of the inner ring 9 and the outer ring 10 are only inclined slightly by virtue of a moment load. In this state, the rolling fatigue life of the rolling surface becomes extremely short. Thus, the construction described under (1) is not desirable as the allowable moment load becomes small. Note that while the configurations of the contact portions can be ellipse no more (resulting in a configuration in which part of the ellipse becomes lost) when the contact portions between the rolling surfaces and the raceway surfaces reach the transverse end edges of the raceway surfaces, for the purpose of description, a state like this will be referred to as "the contact ellipse dislodges from the raceway surface" in this specification.

Next, with the construction described under (2), the rolling surfaces of the balls 13 and the inner ring raceway 11a and the outer ring raceway 12a come to contact with each other at a plurality of contact positions, and moreover, in a state in which the engine is driven while the moment load is applied, since the contact positions become asymmetrical relative to the rotating axis of the ball 13, there occur much wear and heat based on slippage at the contact points, which is not desirable.

Next, with the construction described under (3), since the space between the shoulder portions 14a, 14a on the outer circumferential surface of the inner ring 9b and the shoulder portions 14b, 14b on the inner circumferential surface of the outer ring 10b becomes narrow, the diametrical thickness of a retainer 16 for holding the balls 13 becomes thin. Thus, as the thickness of the retainer 16 becomes thin, since it is difficult to secure the durability of the retainer 16, in consideration of the durability of the retainer 16, the effect of reducing the angular gap using the procedure described under (3) is limited.

Furthermore, with the construction described under (4), although the effect of reducing the angular gap and securement of the durability of the constituent components becomes compatible at a higher order, the increase in axial dimension cannot be avoided. The rotational supporting portion such as the follower pulley 4 has to be installed within a limited space in many cases, and therefore the increase in axial dimension is not desirable. Moreover, as the axial dimension increases, the production cost of the respective constituent components also increases.

SUMMARY OF THE INVENTION

It is an object of the present invention to provide a single row deep groove radial ball bearing which can solve the inconveniences as described above.

Similarly to single row deep groove radial ball bearings conventionally widely known, any of single row deep groove radial ball bearings according to the invention comprises an inner ring having a deep groove inner ring raceway formed in an outer circumferential surface thereof, an outer ring having a deep groove outer ring raceway formed in an inner circumferential surface thereof and a plurality of balls rotatably provided between the inner ring and the outer ring.

In particularly, in the single row deep groove radial ball bearing according to the present invention, at least one of the inner ring raceway and the outer ring raceway has a cross-sectional shape in which a transversely central portion thereof is different in a radius of curvature from transverse end portions between which the transversely central portion is interposed, and also transverse end edges of the portions having different radius of curvatures are made to be smoothly continuous with each other.

In the above-mentioned single row deep groove radial ball bearing as set forth in the invention, it is advantageous that the radius of curvature of the cross-sectional shape of at least one (or preferably, both) of the inner ring raceway and the outer ring raceway is made smaller at a transversely central portion and larger at transverse end portions, and transverse end edges of the portions having different radius of curvatures are made to be smoothly continuous with each other.

According to the single row deep groove radial ball bearings constructed as described above in accordance with the invention, the reduction of the angular gap and securement of the allowable moment load can be established at a higher order.

First of all, with the single row deep groove radial ball bearing as set forth in the invention, since the radius of curvature of the cross-sectional shape of the raceway is made larger at the transverse end portions, in the event that the central axis of the inner ring and the central axis of the outer ring are inclined toward each other based on the moment load, and that the contact point between the rolling surface of the ball and the raceway is displaced to the transverse end portion side of the raceway, the contact ellipse existing at the contact point becomes small. Due to this, it is difficult for the contact ellipse to dislodge from the raceway, the allowable moment load can be secured. Moreover, since the radius of curvature of the cross-sectional shape of the transversely central portion of the raceway is made smaller, when compared with a case where the entirety of the raceway constitutes a single curved surface having a large radius of curvature, the rolling surface of the ball and the raceway are allowed to get closer to each other to thereby reduce the angular gap.

Furthermore, in the above-mentioned single row deep groove radial ball bearing as set forth in the invention, it is advantageous that the radius of curvature of the cross-sectional shape of at least one (or preferably, both) of the inner ring raceway and the outer ring raceway is made larger at a transversely central portion and smaller at transverse end portions, and transverse end edges of the portions having different radius of curvatures are made to be smoothly continuous with each other.

According to the single row deep groove radial ball bearings constructed as described above in accordance with the other aspect of the invention, the reduction of the angular gap and securement of the allowable moment load can be established at a higher order.

With the single row deep groove radial ball bearing as set forth in the invention, since the radius of curvature of the cross-sectional shape of the raceway is made smaller at the transverse end portions, when compared with the single curved surface having a large radius of curvature, the rolling surface of the ball and the raceway are allowed to get closer to each other to thereby reduce the angular gap. In this case, too, since the radius of curvature of the cross-sectional shape of the raceway is made larger at the transversely central portion, even in the event that the central axis of the inner ring and the central axis of the outer ring are inclined toward each other based on the moment load, and that the contact point between the rolling surface of the ball and the raceway is displaced to the transverse end portions of the raceway, it is difficult for the contact ellipse to dislodge from the raceway to thereby secure the allowable moment load.

DETAILED DESCRIPTION OF THE PREFERRED EMBODIMENTS

Figure 1:
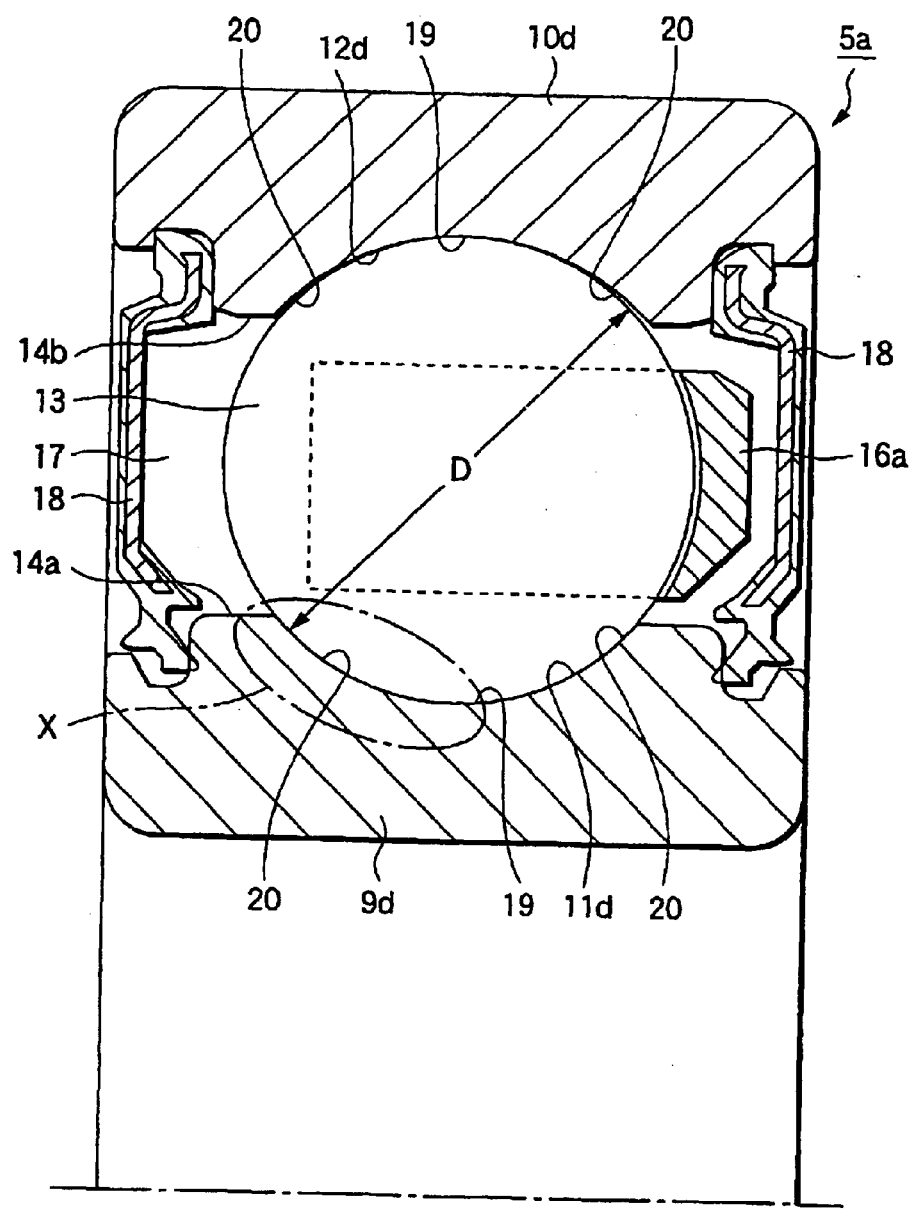
FIG. 1 shows a partial sectional view illustrating a first embodiment of the invention.
Figure 2:
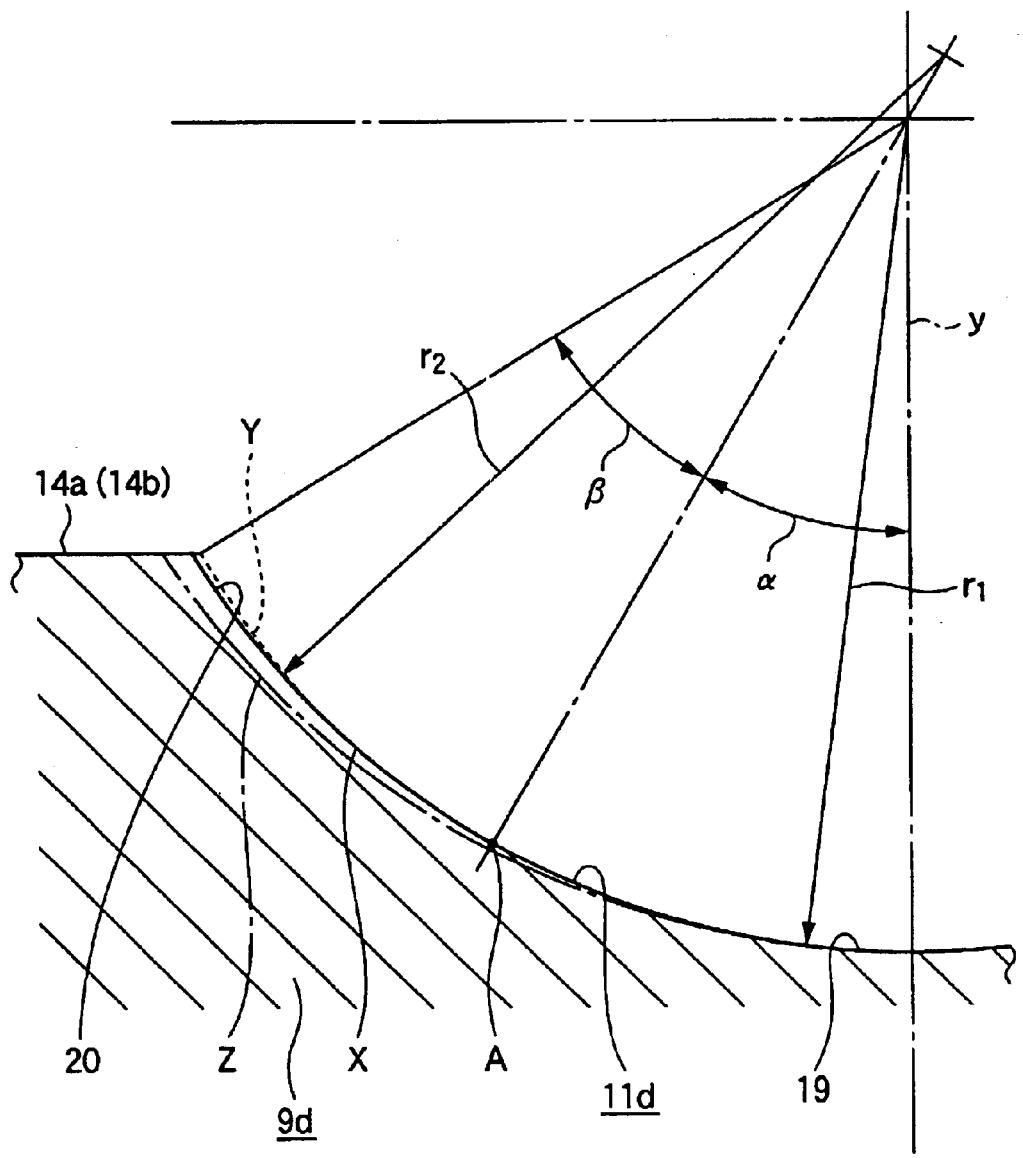
FIG. 2 shows an enlarged view illustrating an X portion of FIG. 1.

FIGS. 1 and 2 illustrate a first embodiment corresponding to the invention. Similarly to the conventionally well known single row deep groove radial ball bearings, a single row deep groove radial ball bearing 5a according to the invention comprises an inner ring 9d, an outer ring 10d and a plurality of balls 13. The inner ring 9d has a deep groove inner ring raceway 11d formed in an outer circumferential surface thereof. The outer ring 10d has a deep groove outer ring raceway 12d formed in an inner circumferential surface thereof. The plurality of balls 13 are rotatably provided between the inner ring raceway 11d and the outer ring raceway 12d. In addition, the plurality of balls 13 are retained by a retainer 16a so as to roll freely. Openings at ends of an annular space 17 formed between the outer circumferential surface of the inner ring 9d and the inner circumferential surface of the outer ring 10d are closed with seal plates 18, 18, respectively.

In particular, in the single row deep groove radial ball bearing 5a according to the invention, the radius of curvatures of the cross-sectional shapes of the inner ring raceway 11d and the outer ring raceway 12d are made smaller at the transversely (in left and right directions in FIG. 1) central portions and larger at the transverse end portions of the respective raceways, and the transverse end edges of the portions having the different radius of curvatures are made to be smoothly continuous with each other. In other words, as shown in detail by a solid line X in FIG. 2, the cross-sectional shape of the inner ring raceway 11d is constituted by a central portion 19 having a radius of curvature r1 and a pair of end portions 20, 20 each having a radius of curvature of r2. In this embodiment, the cross-sectional shapes of the inner ring raceway 11d and the outer ring raceway 12d are basically the same, and therefore, the cross-sectional shape of the inner ring raceway 11d shown in FIG. 2 will be described.

With the present embodiment, the radius of curvature r2 of each of the end portions 20, 20 is made larger than the radius of curvature r1 of the central portion 19 (r2>r1). The central portion 19 is formed through a central angle of α (for example, in the order of 25 to 35 degrees) on each side of a center line relative to the transverse direction which is indicated by a chain line y in FIG. 2, and therefore as a whole, the central portion 19 is formed over a total central angle of 2α across the center line. The radius of curvature r1 of this central portion 19 is made slightly larger than 50% of the outside diameter of the ball 13 (for example, in the order of 50.5 to 52%, preferably 51 to 52%). In contrast to this, the respective end portions 20, 20 are formed through a central angle of β (for example, in the order of 25 to 35 degrees) on each side of the central portion 19 (in such a manner as to hold the central portion 19 therebetween). The radius of curvature r2 of each of the end portions 20, 20 is made a bit larger than 50% of the outside diameter of the ball (for example, in the order of 53 to 55%, preferably 53 to 54%).

Then, the transverse end edges of the central portion 19 and the transverse inner end edges of the respective end portions 20, 20 are made to be smoothly continuous with each other, respectively, at a portion indicated by a point A in FIG. 2. Due to this, in this embodiment, the tangential direction of an arc having the radius of curvature r1 and the tangential direction of an arc having the radius of curvature r2 are caused to match with each other.

In other words, the central portion 19 and the respective portions 20 has a common tangential line at a connecting portion A therebetween.

According to the single row deep groove radial ball bearing of the present embodiment which is constructed as described above, the reduction of the angular gap and securement of the allowable moment load are compatible at a higher order. Namely, with the single row deep groove radial bearing 5a according to the present embodiment, the radius of curvatures of the cross-sectional shapes of the inner ring raceway 11d and the outer ring raceway 12d are made to be a relatively larger radius of curvature r2 at the transverse end portions 20, 20. Consequently, even if the center axis of the inner ring 9d and the center axis of the outer ring 10d are inclined towards each other based on the moment load and the contact point between the rolling surface of the ball 13 and the inner ring raceway 11d and the outer ring raceway 12d is displaced toward the transverse end portion side, whereby the rolling surface of the ball 13 contacts the transverse end portions 20, 20, the contact ellipse existing at the contact portion is small. Due to this, it is difficult for the contact ellipse to dislodge from the inner ring raceway lid and the outer ring raceway 12d, thereby making it possible to secure the allowable moment load.

In other words, in a case where the cross-sectional shapes of the inner ring raceway 11d and the outer ring raceway 12d are made to be a single curved surface having the relatively small radius of curvature r1, as shown by a broken line Y in FIG. 2, the radius of curvature r1 remains as small as it is to a continuous portion with the shoulder portion 14a (14b) of the inner ring 9d and the outer ring 10d. Then, even in a state in which the rolling surface of the ball 13 is in contact with a portion in the vicinity of the shoulder portion 14a (14b), the contact ellipse existing at the contact portion remains large, and it becomes easy for the contact ellipse to dislodge from the inner ring raceway 11d and the outer ring raceway 12d, thereby making it difficult to secure the allowable moment load. In contrast with this, with the present embodiment, as described above, in the state in which the rolling surface of the ball 13 is in contact with the portion in the vicinity of the shoulder portion 14a (14b), since the contact ellipse existing at the contact portion becomes small, it is possible to secure the moment load as described above.

Moreover, since the radius of curvature r1 of the transversely central portion 19 of the cross-sectional shape of the inner ring raceway 11d and the outer ring raceway 12d is small, when compared with a case where the entirety of the inner ring raceway 11d and the outer ring raceway 12d is made to be a single curved surface having a large radius of curvature, the rolling surface of the ball 13 can get closer to the inner ring raceway 11d and the outer ring raceway 12d to thereby reduce the angular gap.

Namely, in a case where the cross-sectional shapes of the inner ring raceway 11d and the outer ring raceway 12d are made to be a single curved surface having the relatively large radius of curvature r2, as shown by a chain line Z in FIG. 2, the radius of curvature r2 remains as large as it is to the continuous portion with the shoulder portion 14a (14b) of the inner ring 9d and the outer ring 10d. Due to this, the gap between the rolling surface of the ball 13 and the two raceways 11d, 12d becomes larger at the transverse end portions of the inner ring raceways 11d and the outer ring raceway 12d, and thus, the angular gap cannot be reduced. In contrast with this, with the present embodiment, as described above, since the radius of curvature r1 of the transversely central portion 19 of the cross-sectional shape of the inner ring raceway 11d and the outer ring raceway 12d is made small, the gap between the rolling surface of the ball 13 and the two raceways 11d, 12d can be reduced at even at the transverse end portions of the inner ring raceway 11d and the outer ring raceway 12d, thereby making it possible to reduce the angular gap.

Figure 3:
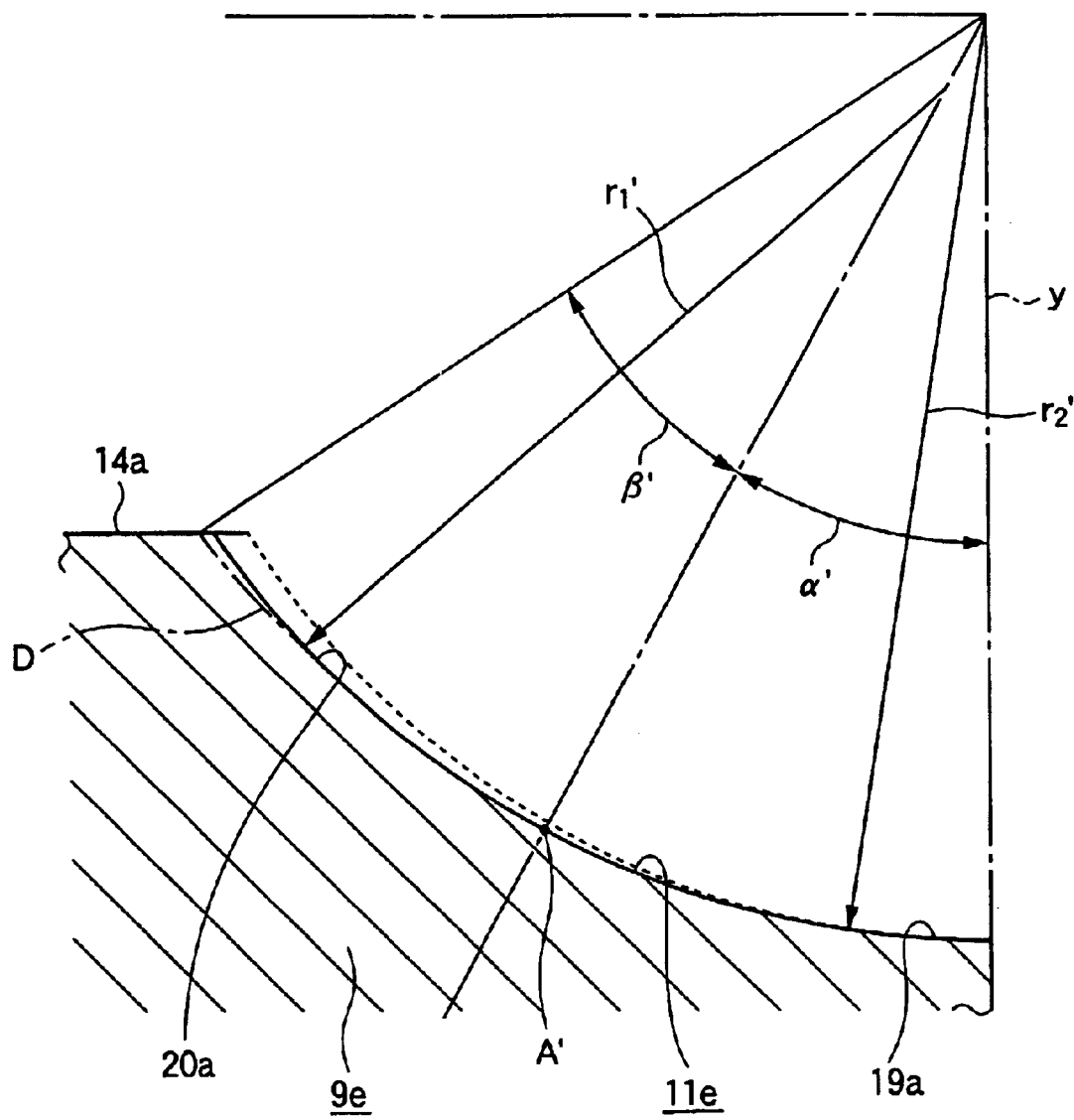
FIG. 3 shows a similar view to FIG. 2, illustrating a second embodiment of the invention.

Next, FIG. 3 illustrates a second embodiment corresponding to a second aspect of the invention. In the present embodiment, the radius of curvature of the cross-sectional shape of an inner ring raceway lie (an outer ring raceway) is made lager at a transversely central portion 19a and smaller at transverse end portions 20a. Note that in this embodiment, too, since the cross-sectional shapes of the inner ring raceway lie and the outer ring raceway, not shown, are basically identical, the cross-sectional shape of the inner ring raceway shown in FIG. 3 will only be described below.

In this embodiment, the radius of curvature r1' of each of the end portions 20a is made smaller than the radius of curvature r2' of the central portion 19a (r2'>r1'). The central portion 19a is formed through a central angle of α' (for example, in the order of 25 to 35 degrees) on each side of a center line relative to the transverse direction which is indicated by a chain line y in FIG. 3, and therefore as a whole, the central portion 19a is formed over a total central angle of 2α' across the center line. The radius of curvature r2' of this central portion 19a is made a bit larger than 50% of the outside diameter (FIG. 1) of the ball 13 (for example, in the order of 53 to 55%, preferably 53 to 54%). In contrast with this, the respective end portions 20a are formed through a central angle of β' (for example, in the order of 25 to 35 degrees) on each side of the central portion 19a (in such a manner as to hold the central portion 19a therebetween). The radius of curvature r1' of each of the end portions 20a is made slightly larger than 50% of the outside diameter of the ball 13 (for example, in the order of 50.5 to 52%, preferably 51 to 52%).

Then, the transverse end edges of the central portion 19a and the transverse inner end edges of the respective end portions 20a are made to be smoothly continuous with each other, respectively, at a portion indicated by a point A' in FIG. 3. Due to this, in this embodiment, the tangential direction of an arc having the radius of curvature r2' and the tangential direction of an arc having the radius of curvature r1' are caused to match with each other.

In other words, the central portion 19a and the respective portions 20a has a common tangential line at a connecting portion A' therebetween.

In the single row deep groove radial ball bearing of the invention which is constructed as described above, since the radius of curvatures of the cross-sectional shapes of the inner ring raceway 11e and the outer ring raceway, not shown, are made to be the smaller value r1' at the transverse end portions 20a, when compared with a single curved surface having the larger radius of curvature r2', the rolling surface of the ball and the relevant raceway can get closer to each other to thereby reduce the angular gap.

Namely, in a case where the cross-sectional shapes of the inner ring raceway lie and the outer ring raceway are a single curved surface having the relatively larger radius of curvature r2', as shown by a chain line D in FIG. 3, the radius of curvature r2' remains as large as it is to the shoulder portion 14a of the inner ring 9e and the outer ring, not shown. Due to this, the gap between the rolling surface of the ball 13 and the two raceways 11e becomes large at the transverse end portions of the inner ring raceway 11e and the outer ring raceway, not shown, and therefore, the angular gap cannot be reduced. In contrast with this, with the present embodiment, as described above, since the radius of curvature r1' of the transverse end portions 20a of the cross-sectional shapes of the inner ring raceway 11e and the outer ring raceway, not shown, is made smaller, the gap between the rolling surface of the ball 13 and the two raceways 11e can be reduced even at the transverse end portions of the inner ring raceway 11e and the outer ring raceway, thereby making it possible to reduce the angular gap.

Even in this case, since the radius of curvature of the cross-sectional shapes of the inner ring raceway 11e and the outer ring raceway, not shown, is made larger at the transverse end portions 19a, even in the event that the center axis of the inner ring 9e and the center axis of the outer ring, not shown, are inclined toward each other based on the moment load and that the contact point between the rolling surface of the ball 13 and the inner ring raceway 11e and the outer ring raceway, not shown, is displaced toward the transverse end portion side of the inner ring raceway 11e and the outer ring raceway, not shown, it becomes difficult for the contact ellipse to dislodge from the inner ring raceway 11e and the outer ring raceway, not shown, to thereby secure the allowable moment load. In addition, the construction of the present embodiment can suppress the generation of heat at normal times (in a state in which the center axes of the inner and outer rings coincide with each other) when it is applied to an application in which only a relatively small moment load is applied such as a case where an intermediate pulley for guiding an endless belt is rotatably supported, and the construction can also be used for an application in which the angular gap is to remain as small as possible.

Figure 4:
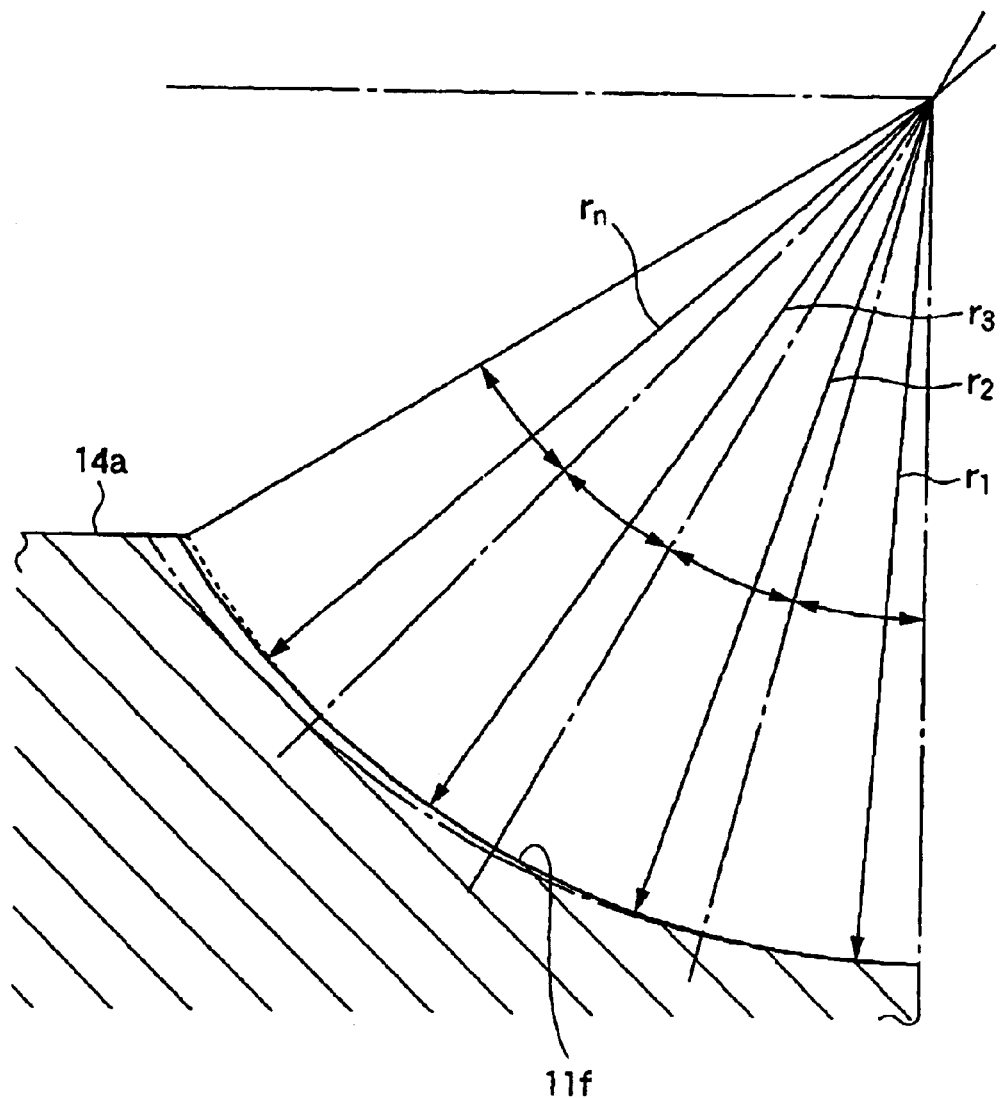
FIG. 4 shows a similar view to FIG. 2, illustrating a third embodiment.
Figure 5:
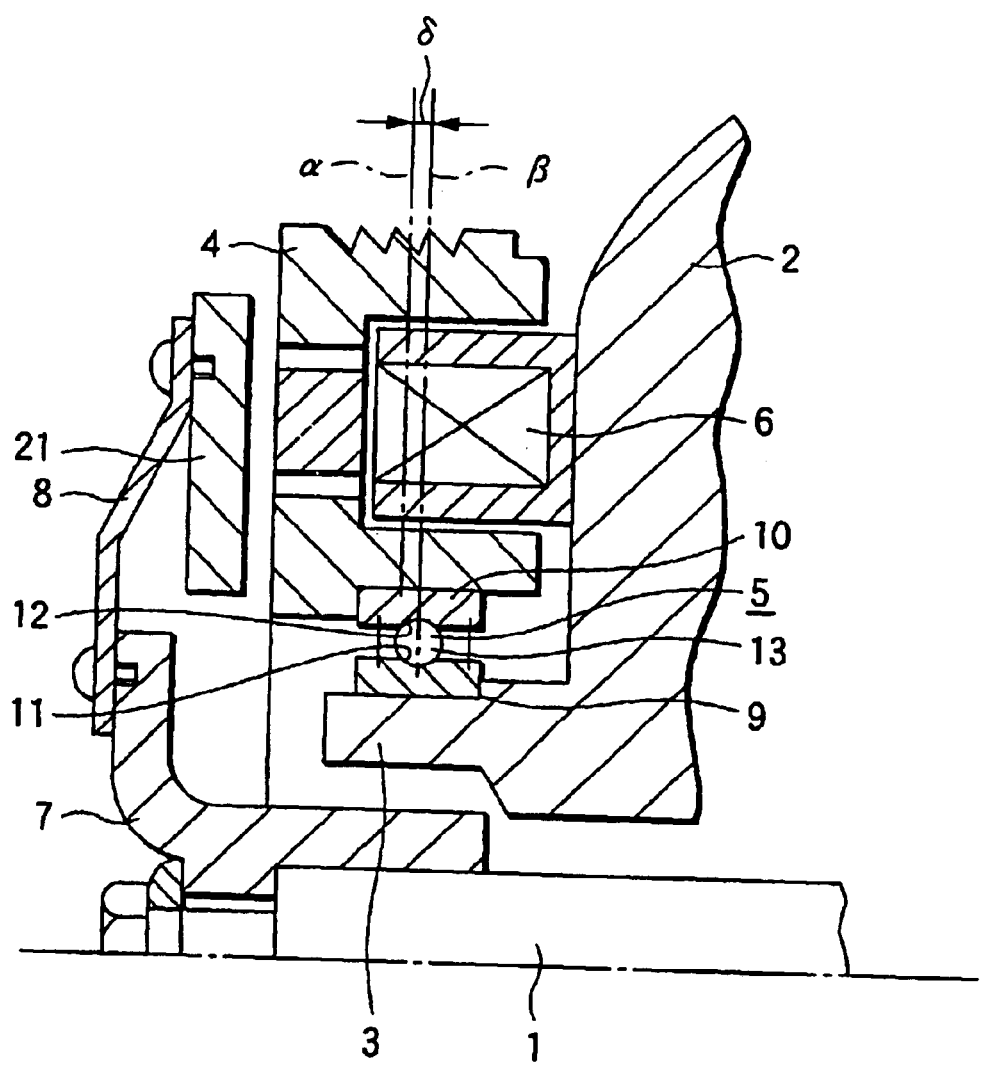
FIG. 5 shows a partial sectional view of a rotational supporting portion, illustrating an exemplary state in which a single row deep groove radial ball bearing.
Figure 6:
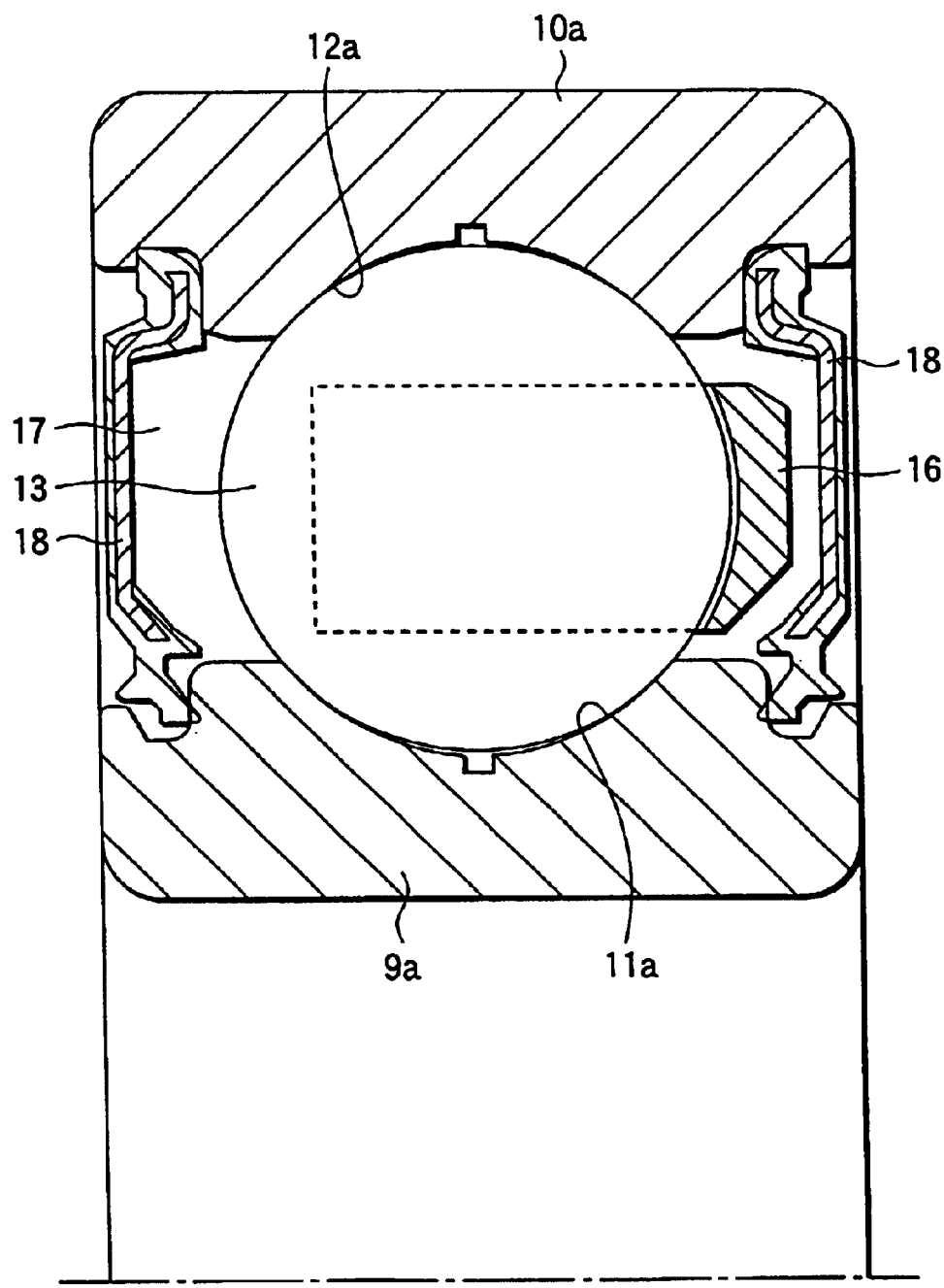
FIG. 6 shows a partial sectional view illustrating a first example of a conventional single row deep groove radial ball bearing.
Figure 7:
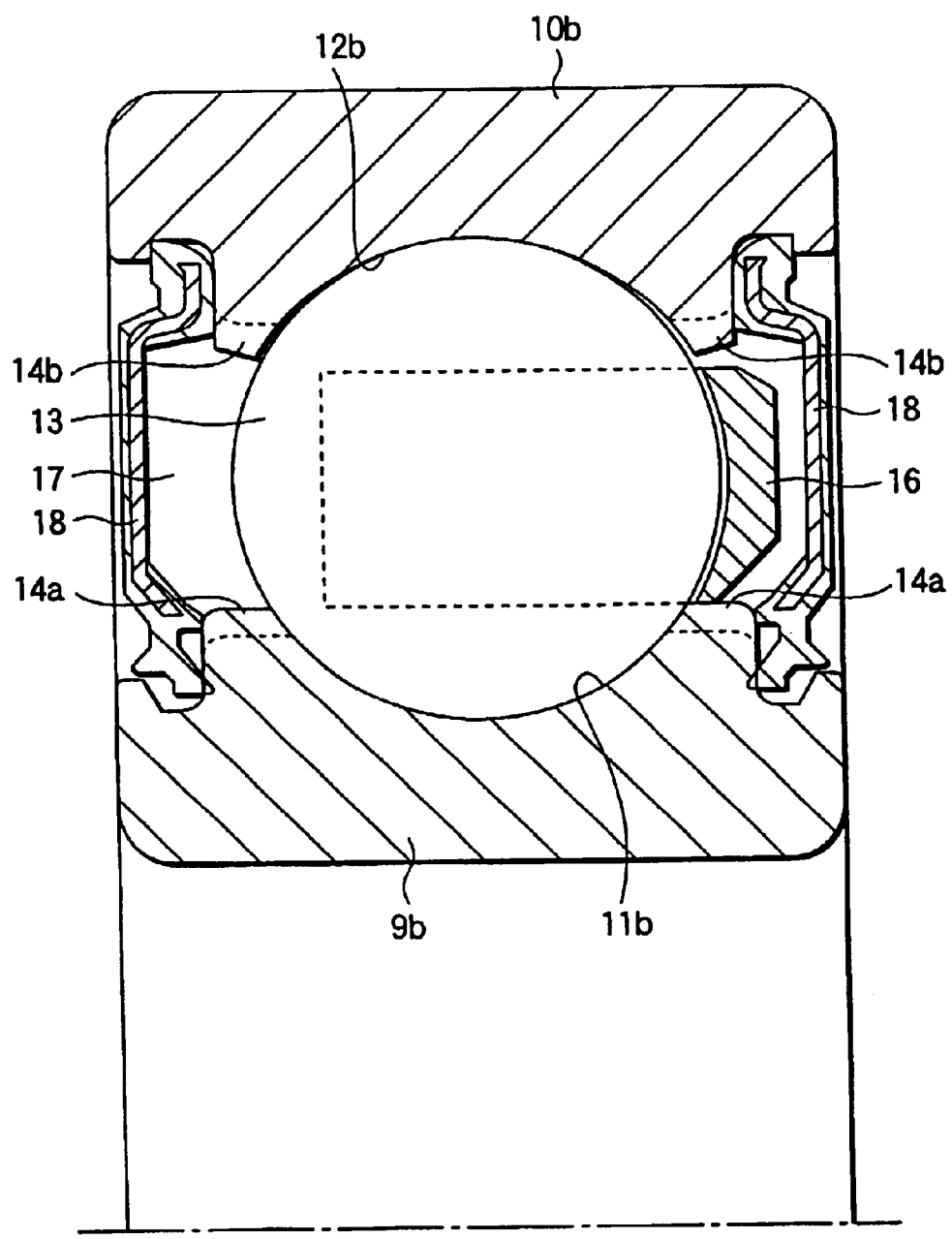
FIG. 7 shows a partial sectional view illustrating a second example of the same.
Figure 8:
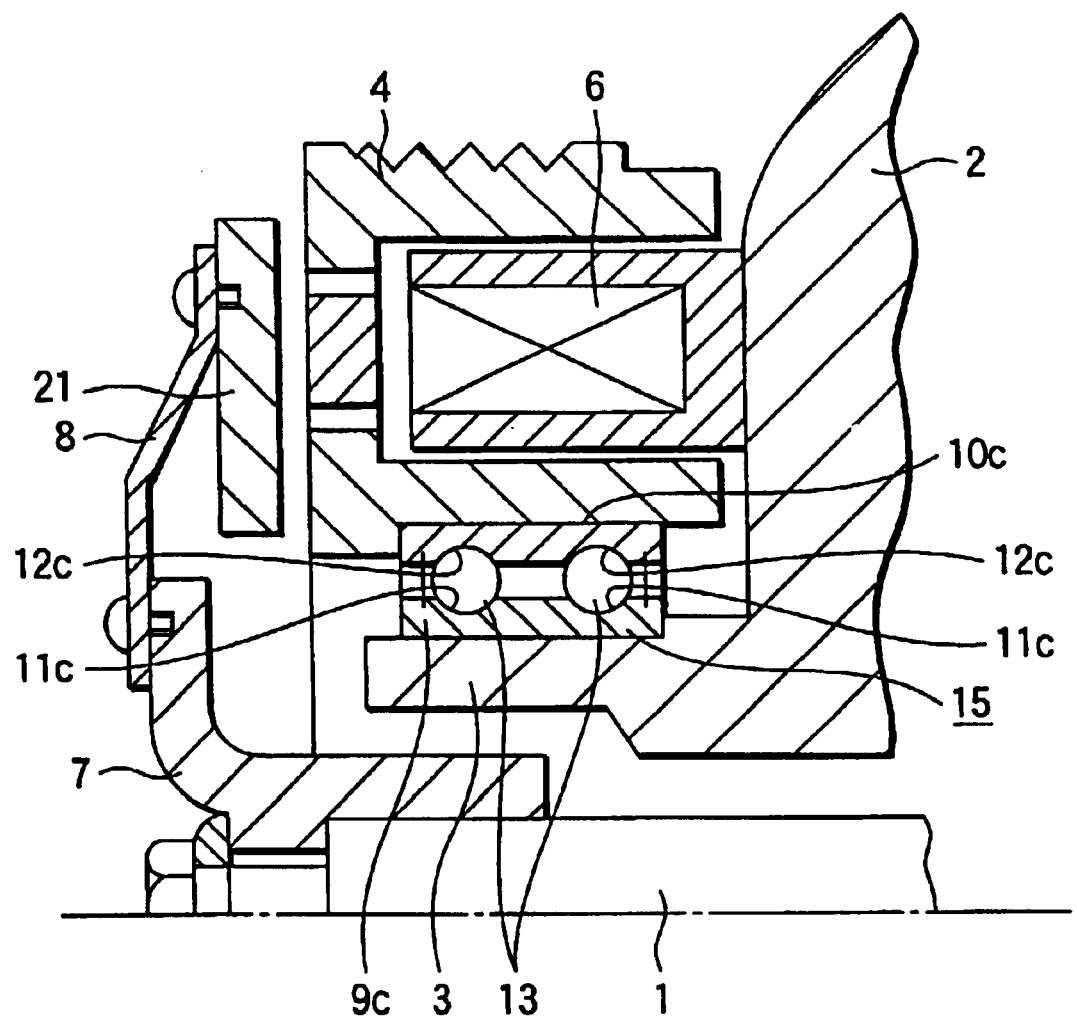
FIG. 8 shows a partial sectional view illustrating a rotational supporting portion constituted by a double-row ball bearing.

Next, FIG. 4 illustrates a third embodiment of the invention. In either of the aforesaid first and second embodiments, while the two different radius of curvatures are used for the cross-sectional shapes of the inner ring raceway 11d, 11e and the outer ring raceway 12d, in this embodiment, there are provided more different radius of curvatures r1, r2, r3. . . rn for use for the cross-sectional shapes of an inner ring raceway 11f. In a case where the present embodiment is used to carry out an aspect of the invention corresponding to the first aspect thereof, the radius of curvature is made to become larger as it approaches a shoulder portion 14a (r1<r2<r3<. . . <rn), while when used to carry out an aspect of the invention corresponding to the second aspect thereof, the radius of curvature is made to become smaller as it approaches the shoulder portion 14a (r1>r2>r3>. . . >rn).

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

Since the single row deep groove radial ball bearing according to the invention is constructed and operates as has been described heretofore, there is no need to increase the axial dimension, and moreover, the generation of heat and wear can be suppressed which would otherwise be generated when the engine is running. Due to this, with the invention, it is possible to suppress the inclination of a member that is to be supported by the single row deep groove balling such as a pulley to thereby extend the life of a belt. Thus, the invention can contribute to miniaturizing various types of mechanical devices having a rotational supporting portion and increasing performances thereof. In addition, the invention can prevent the friction contact of constituent components of an electromagnetic clutch when it is switched off to thereby prevent the generation of abnormal wear and noise.

What is claimed is:

1. A single row deep groove radial ball bearing comprising:

an inner ring having a deep groove inner ring raceway provided at an outer circumferential surface of said inner ring;

an outer ring having a deep groove outer ring raceway provided at an inner circumferential surface of said outer ring; and a plurality of balls rotatably provided between said inner ring raceway and said outer ring raceway;

wherein at least one of said inner ring raceway and said outer ring raceway has a cross-sectional shape in which a transversely central portion thereof is different in a radius of curvature from transverse end portions between which said transversely central portion is interposed; and wherein transverse end edges of said portions having different radius of curvatures are made to be smoothly continuous with each other; and wherein the radius of curvature of the transversely central portion is set to be in the range of 50.5% to 52% of the outside diameter of the ball.

2. The single row deep groove radial ball bearing according to claim 1, wherein the radius of curvature of the transversely central portion is smaller than that of the transverse end portions.

3. The single row deep groove radial ball bearing according to claim 2, wherein the transversely central portion has a central angle in the range of 25 to 35 degrees on each side of a center line in the transverse direction.

4. The single row deep groove radial ball bearing according to claim 3, wherein each of said transverse end portions has a central angle in the range of 25 to 35 degrees on each side of the transversely central portion in the transverse direction.

5. The single row deep groove radial ball bearing according to claim 4, wherein said transversely central portion and each of said transverse end portions have a common tangential line at a connecting portion therebetween.

6. The single row deep groove radial ball bearing according to claim 1, wherein the radius of curvature of each of said transverse end portions is set to be in the range of 53% to 55% of the outside diameter of the ball.

7. The single row deep groove radial ball bearing according to claim 1, wherein the radius of curvature of each of said transverse end portions is set to be in the range of 53% to 54% of the outside diameter of the ball.

8. The single row deep groove radial ball bearing according to claim 1, wherein the radius of curvature of the transversely central portion is set to be in the range of 51% to 52% of the outside diameter of the ball.

9. The single row deep groove radial bail bearing according to claim 8, wherein the radius of curvature of each of said transverse end portions is set to be in the range of 53% to 54% of the outside diameter of the ball.

10. A single row deep groove radial ball bearing comprising:

an inner ring having a deep groove inner ring raceway provided at an outer circumferential surface of said inner ring;

an outer ring having a deep groove outer ring raceway provided at an inner circumferential surface of aid outer ring; and a plurality of balls rotatably provided between said inner ring raceway and said outer ring raceway;

wherein at least one of said inner ring raceway and said outer ring raceway has a cross-sectional shape in which a transversely central portion thereof is different in a radius of curvature from transverse end portions between which said transversely central portion is interposed;

wherein transverse end edges of said portions having different radius of curvatures are made to be smoothly continuous with each other and;

wherein the radius of curvature of each of said transverse end portions is set to be in the range of 50.5% to 52% of the outside diameter of the ball.

11. The single row deep groove radial ball bearing according to claim 10, wherein the radius of curvature of each of said transverse end portions is set to be in the range of 51% to 52% of the outside diameter of the ball.

12. The single row deep groove radial ball bearing according to claim 11, wherein the radius of curvature of the transversely central portion is set to be in the range of 53% to 54% of the outside diameter of the ball.

13. The single row deep groove radial ball bearing according to claim 10, wherein the radius of curvature of the transversely central portion is larger than that of the transverse end portions.

14. The single row deep groove radial ball bearing according to claim 13, wherein the transversely central portion has a central angle in the range of 25 to 35 degrees on each side of a center line in the transverse direction.

15. The single row deep groove radial ball bearing according to claim 14, wherein each of said transverse end portions has a central angle in the range of 25 to 35 degrees on each side of the transversely central portion in the transverse direction.

16. The single row deep groove radial ball bearing according to claim 15, wherein the radius of curvature of the transversely central portion is set to be in the range of 53% to 55% of the outside diameter of the ball.

17. The single row deep groove radial ball bearing according to claim 16, wherein said transversely central portion and each of said transverse end portions have a common tangential line at a connecting portion therebetween.

18. The single row deep groove radial ball bearing according to claim 16, wherein the radius of curvature of the transversely central portion is set to be in the range of 53% to 54% of the outside diameter of the ball.

* * * * *